(12) United States Patent
Bennett (10) Patent No.: US 10,442,527 B2
(45) Date of Patent: Oct. 15, 2019

(54) AIRCRAFT LANDING GEAR

(71) Applicant: Safran Landing Systems UK LTD, Gloucester (GB)

(72) Inventor: Ian Bennett, Gloucester (GB)

(73) Assignee: Safran Landing Systems UK LTD (GB)

( * ) Notice: Subject to any disclaimer, the term of this patent is extended or adjusted under 35 U.S.C. 154(b) by 300 days.

(21) Appl. No.: 15/639,245

(22) Filed: Jun. 30, 2017

(65) Prior Publication Data

US 2018/0001998 A1 Jan. 4, 2018

(30) Foreign Application Priority Data

Jul. 1, 2016 (EP) ..................................... 16177652

(51) Int. Cl.
| | |
|---|---|
| *B64C 25/60* | (2006.01) |
| *B64C 25/20* | (2006.01) |
| *B64C 25/10* | (2006.01) |
| *B64C 25/34* | (2006.01) |
| *B64C 25/00* | (2006.01) |

(52) U.S. Cl.
CPC .............. *B64C 25/20* (2013.01); *B64C 25/10* (2013.01); *B64C 25/34* (2013.01); *B64C 25/60* (2013.01); *B64C 2025/008* (2013.01)

(58) Field of Classification Search
CPC ....... B64C 25/60; B64C 2025/008; F16F 9/26
See application file for complete search history.

(56) References Cited

U.S. PATENT DOCUMENTS

| | | | | |
|---|---|---|---|---|
| 3,056,598 | A | * 10/1962 | Ransom | .................. B64C 25/60 |
| | | | | 267/64.26 |
| 4,561,612 | A | * 12/1985 | Masclet | .................. B64C 25/14 |
| | | | | 244/102 SS |
| 4,749,152 | A | * 6/1988 | Veaux | ..................... B64C 25/60 |
| | | | | 188/321.11 |

(Continued)

FOREIGN PATENT DOCUMENTS

| | | |
|---|---|---|
| EP | 2987724 A1 | 2/2016 |
| FR | 92984 E | 1/1969 |
| GB | 2137147 A | 10/1984 |

OTHER PUBLICATIONS

European Search Report for European Application No. 16177652.1-1754, dated Feb. 1, 2017—11 Pages.

(Continued)

*Primary Examiner* — Brian M O'Hara
(74) *Attorney, Agent, or Firm* — RatnerPrestia (57) ABSTRACT

An aircraft landing gear having a shock absorbing strut and a shortening mechanism coupled between an elongate beam and a shortening portion of a shock absorber. The shortening mechanism is arranged such that when the elongate beam is at a first position due to a first extension state of the retraction actuator the shortening mechanism is in a locked condition in which it inhibits axial movement of the shortening portion within the strut element in the first direction axial direction, and as the retraction actuator changes in extension state from the first extension state towards a second extension state, the retraction actuator moves the elongate beam which in turn causes the shortening mechanism to move the shortening portion within the strut element in the first axial direction to shorten the shock absorbing strut.

15 Claims, 6 Drawing Sheets

(56) References Cited

U.S. PATENT DOCUMENTS

| | | | | |
|---|---|---|---|---|
| 5,299,761 | A | * | 4/1994 | Robin .................... B64C 25/20 |
| | | | | 244/102 R |
| 6,340,153 | B1 | * | 1/2002 | Miesner .................... F16F 9/18 |
| | | | | 188/316 |
| 9,481,452 | B2 | * | 11/2016 | Lindahl ................... B64C 25/22 |
| 2018/0244372 | A1 | * | 8/2018 | Simpson ................ B64C 25/60 |

OTHER PUBLICATIONS

Aircraft Landing Gear Systems, Landing Gear Types, Chapter 13, dated Oct. 31, 2013, retrieved from https://web.archive.org/web/20131031205216/http://www.faa.gov/regulations_policies/handbooks_manuals/aircraft/amt_airframe handbook/media/ama_Ch13.pkd, 96 pages.
Vulcan Main Landing Gear Illustration, 1 page, Admitted to be publicly available as prior art before Jun. 30, 2017.
BAE 146 Main Landing Gear Illustration, 1 page, Admitted to be publicly available as prior art before Jun. 30, 2017.
BAE ATP Nose Landing Gear Illustration, 1 page, Admitted to be publicly available as prior art before Jun. 30, 2017.
Bucaneer Main Landing Gear Prototype Illustration, 1 page, Admitted to be publicly available as prior art before Jun. 30, 2017.
Meteor Main Landing Gear Illustration, 1 page, Admitted to be publicly available as prior art before Jun. 30, 2017.
A334340 Shortening Illustration, 2 pages, Admitted to be publicly available as prior art before Jun. 30, 2017.

\* cited by examiner

AIRCRAFT LANDING GEAR

This application claims the benefit of and priority to European Application EP16177652, filed on Jul. 1, 2016, the contents of which are incorporated herein by reference.

BACKGROUND OF THE INVENTION

An aircraft landing gear bay is a space within an aircraft that is configured to accommodate a stowed landing gear. The landing gear may have been designed specifically for the aircraft.

It can be desirable for the main strut of a landing gear to be longer than a standard landing gear main strut for a particular aircraft in order to raise the aircraft higher to improve ground clearance. However, unless the landing gear bay is redesigned to accommodate the increase in length, the landing gear must still be capable of retracting into the existing space within the bay. Hence the landing gear is required to shorten on retraction.

Various means are known by which to shorten a landing gear on retraction. This can involve a dedicated shortening mechanism which must be attached to a structural part of the landing gear bay.

However, an aircraft landing gear bay structure may not have been designed for a shortening landing gear and therefore there may not be a region that is sufficiently strong at which to attach a shortening mechanism.

SUMMARY OF THE INVENTION

According to a first aspect of the invention, there is provided an aircraft landing gear having a shock absorbing strut arranged to support the weight of an aircraft on the ground. The shock absorbing strut includes: a hollow strut element having an open first end and a mounting connector at a second end via which the strut element is arranged to be pivotally connected to the aircraft to define a strut pivot axis; and a shock absorber, the shock absorber including an outer cylinder and a sliding tube, one of the outer cylinder and the sliding tube comprising a shortening portion which is slidably mounted relative to the strut element for axial movement relative to the strut element and the other one of the outer cylinder and the sliding tube having a wheel assembly coupling, the shock absorber including a mechanical linkage between the shortening portion and the other one of the outer cylinder and the sliding tube, the mechanical linkage being configured to engage the other one of the outer cylinder and the sliding tube when the shock absorber is extended such that axial movement of the shortening portion within the strut element in a first axial direction towards the strut pivot axis causes the other one of the outer cylinder and the sliding tube to move towards the strut pivot axis to shorten the shock absorbing strut. The landing gear also has: a retraction actuator pivotally coupled at a first end to a lug on the strut element and pivotally connected at a second end to an actuator link, the actuator link having an aircraft connector via which it is arranged to be pivotally coupled to the aircraft; an elongate beam pivotally coupled at a first end to the second end of the retraction actuator and pivotally coupled to a second lug on the strut element, and a shortening mechanism coupled between the elongate beam and shortening the portion of the shock absorber. The shortening mechanism is arranged such that when the elongate beam is at a first position due to a first extension state of the retraction actuator the shortening mechanism is in a locked condition in which it inhibits axial movement of the shortening portion within the strut element in the first direction axial direction; and as the retraction actuator changes in extension state from the first extension state towards a second extension state, the retraction actuator moves the elongate beam which in turn causes the shortening mechanism to move the shortening portion within the strut element in the first axial direction to shorten the shock absorbing strut.

Thus, the shortening mechanism is connected to the elongate 'walking' beam, rather than requiring an attachment to the aircraft structure directly. A walking beam is conventionally provided for the purpose of providing mechanical advantage to a retraction actuator. The present inventor has identified that in landing gear which include a walking beam, the walking beam is conveniently situated to be coupled to the shortening portion via a shortening linkage and the walking beam moves in a manner which causes it to sufficiently mimic a static attachment point on the bay roof relative to the shock absorbing strut of landing gear. The landing gear is configured to move the shortening portion of the shock absorber from a first distance from the strut pivot axis to a relatively close second distance from the strut pivot axis.

When the shortening mechanism is in the locked condition it can be arranged in an over-center configuration in which it inhibits axial movement of the shortening portion within the strut element in the first direction axial direction by reacting in compression. In this condition, a linkage of the shortening mechanism can be arranged to press against an abutment on the landing gear to react applied load.

As the retraction actuator changes in extension state from the first extension state towards a second extension state, the movement of the elongate beam can cause the shortening mechanism to pull the shortening portion within the strut element in the first axial direction under tension to shorten the shock absorbing strut.

The axial distance between the first and second positions can be at least 50 mm and preferably at least 80 mm and in some cases at least 100 mm.

The shortening mechanism can be coupled between a pivot point at the second end of the elongate beam and a pivot point on the shortening portion of the shock absorber.

The shortening linkage can be coupled to the elongate walking beam at an extension portion of the walking beam which projects beyond the strut element lug pivot on the beam. This can provide a shorter path to the shortening potion.

The shortening mechanism can include a lever pivotally coupled at a midpoint to a third lug on the strut element, one end of the lever being pivotally coupled to a drive link which in turn is pivotally coupled to the second end of the elongate beam, the second end of the lever being pivotally coupled to a shortening link which in turn is pivotally coupled to the shortening portion of the shock absorber.

The lever can be of unitary construction, which can simplify assembly of the shortening mechanism and be lighter in weight relative to a two part lever.

The retraction actuator can comprise a linear actuator.

The aircraft landing gear can comprise a 'capsule type' shock absorber in which at least some of the shock absorber is located within the strut element.

Alternatively, the outer cylinder of the shock absorber can define the strut element.

The sliding tube can comprise a piston and rod assembly, the piston of which is slidably coupled within the bore of the strut element for axial movement within it, the rod of which extends from the open first end of the bore through a first bearing and seal assembly.

The shock absorber can comprise a shock absorber according to the second aspect.

In accordance with a second aspect of the invention, there is provided a shock absorber having: an outer cylinder defining a bore that is open at a first end of the outer cylinder; a piston and rod assembly the piston of which is slidably coupled within the bore of the outer cylinder for axial movement within it, the rod of which extends from the open first end of the bore through a first bearing and seal assembly; a diaphragm slidably coupled within the bore of the outer cylinder between the piston and a second end of the outer cylinder, the diaphragm and/or inner wall of the outer cylinder being provided with one or more first dynamic seals arranged such that the diaphragm can move between a first position and a second position while maintaining a fluid seal between the diaphragm and the inner wall of the outer cylinder; a mechanical linkage between the diaphragm and the piston and rod assembly that limits axial separation between them; and a shortening device arranged to move the diaphragm between the first and second positions, wherein the shock absorber is arranged such that with the diaphragm in the first position the mechanical linkage is positioned to permit extension and contraction of the shock absorber and as the diaphragm is moved from the first position towards the second position by the shortening device with the shock absorber fully extended the mechanical linkage pulls the piston and rod assembly to shorten the shock absorber.

The outer diameter of the diaphragm can be equal to the outer diameter of the rod of the piston and rod assembly. This lead to the volume of the shock absorber remaining constant as the diaphragm moves.

The mechanical linkage can comprise an orifice support tube which extends from the diaphragm into a hollow bore defined by the piston and rod assembly, the orifice support tube including an outwardly projecting radial flange which engages with the piston to pull the piston and rod assembly to shorten the shock absorber.

The outer circumferential wall of the diaphragm can be provided with one or more first dynamic seals arranged to act against the inner wall of the outer cylinder for sealing engagement with it as the diaphragm moves.

The inner wall of the outer cylinder can be provided with one of more first dynamic seals arranged to act against the outer circumferential wall of the diaphragm for sealing engagement with it as the diaphragm moves.

The portion of the outer cylinder on the outside of the diaphragm relative to the piston can be non-pressurized; for example, open to ambient. This enables a shortening linkage such as those described with reference to the second aspect to be used to move the shortening portion.

The shortening device as defined in the second aspect can comprise a shortening mechanism as defined in the first aspect.

In accordance with a third aspect of the invention, there is provided an aircraft landing gear including a main shock absorber strut including a shock absorber according to the second aspect.

In accordance with a fourth aspect of the invention, there is provided an aircraft comprising an aircraft landing gear according to the first aspect or the third aspect.

In any embodiment, pivot points can be replaced by other types of flexible couplings that permit relative movement between parts while holding them together.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFICATION DESCRIPTION OF EMBODIMENTS OF THE INVENTION

Figure 1A:
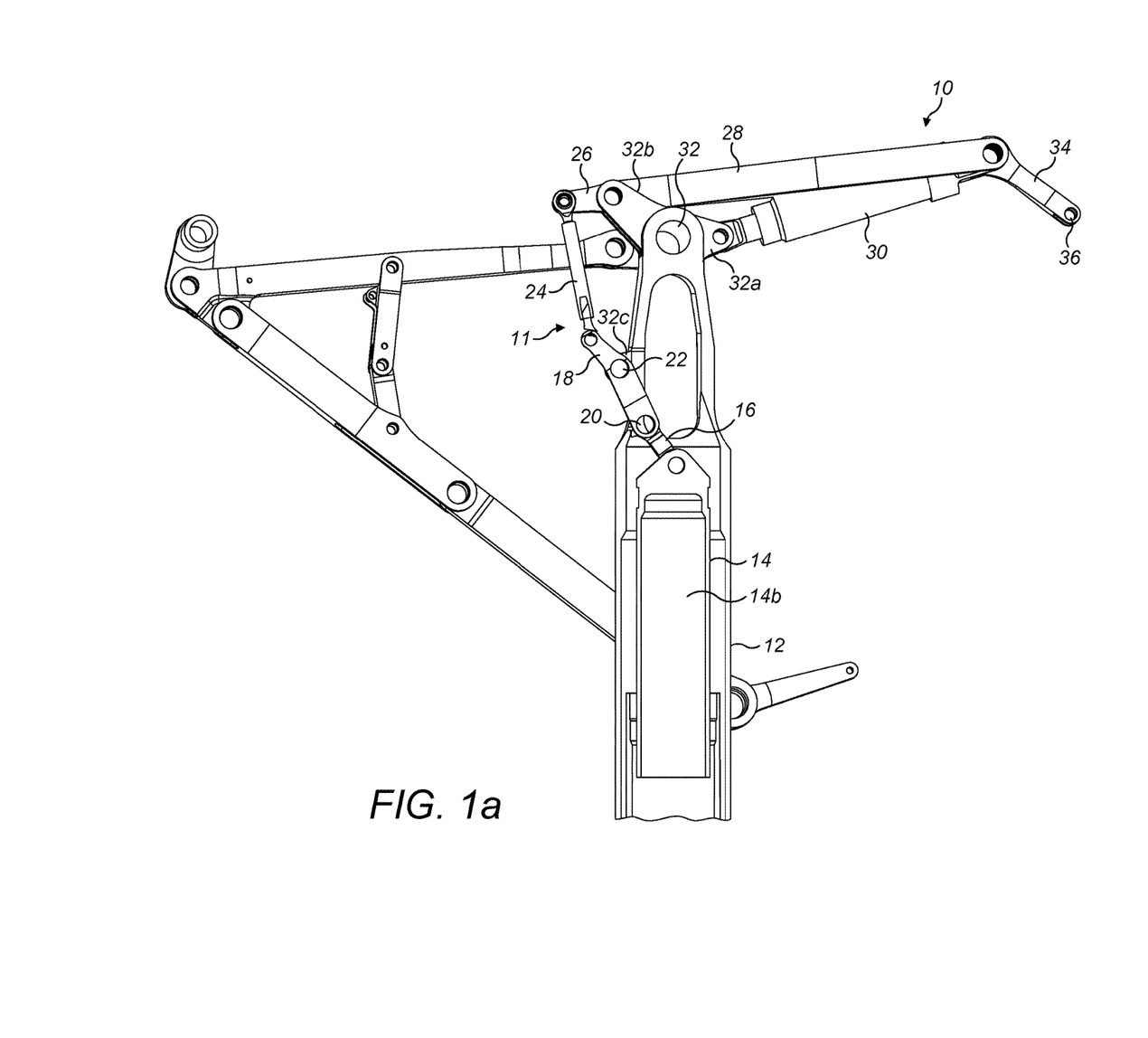
FIG. 1a is a diagram of an aircraft landing gear according to an embodiment of the invention in a deployed condition.
Figure 1B:
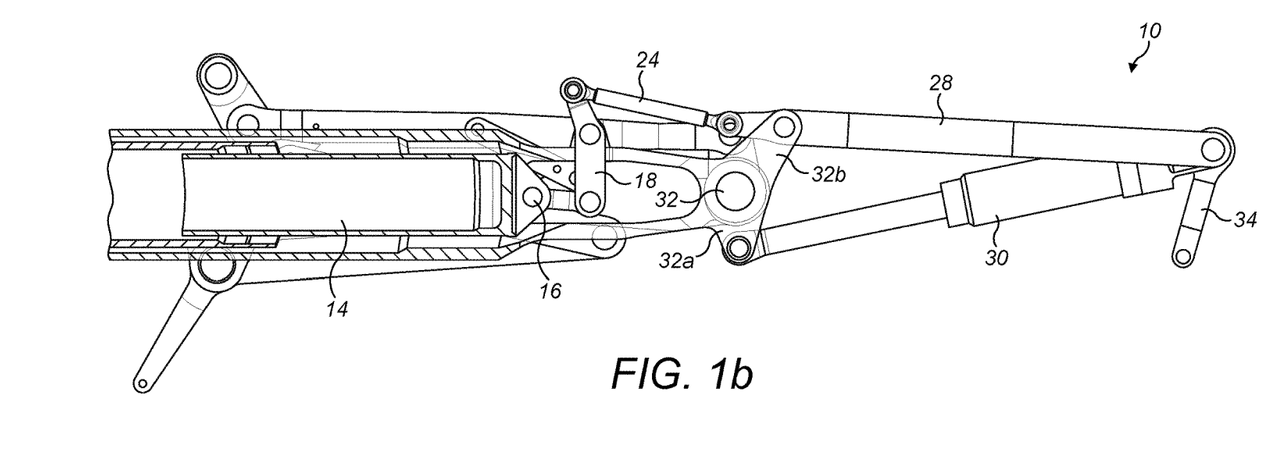
FIG. 1b is a diagram of the aircraft landing gear of FIG. 1 in a retracted condition.

FIGS. 1a and 1b show part of an aircraft landing gear 10 with a retraction actuator 30 forming part of a 'walking beam' linkage to reduce actuator load at the expense of increasing stroke.

A shortening the mechanism 11 for shortening the length of the main shock absorbing strut comprises a strut element or main fitting 12, in which a shock absorber 14 is able to slide axially. The shock absorber 14 is also able to compress telescopically and carries an axle and wheels (not shown) at its lower end. The shortening mechanism 11 applies the principle of two over-center links (the shortening link 16 and the lower limb of the lever 18) pressing against an abutment 20 when the landing gear is down to hold the top of the shock absorber assembly 14 in the extended position.

In this embodiment the lever 18 is driven by an upper limb on the opposite side to the lower limb, although in principle the two limbs could be arranged with any angle between them, or could be spaced laterally along the axis of pivot pin 22. The upper limb is driven by a drive link 24 which is attached to an extension 26 or other convenient point on the walking beam 28. The drive link 24 may be internally sprung such that it maintains a force to keep the shortening link 16 or lever 18 against the abutment stop 20, or the resilience of the mechanism 11 may be used to achieve a similar effect.

When the landing gear starts to retract a retraction actuator 30 extends, and both pushes on the lugs on the main fitting pintle area 32 and causes an actuator link 34 to swing around its aircraft attachment point 36. However the actuator link 34 is restrained in its motion due to its attachment to the walking beam 28, and the walking beam 28 is restrained by its own attachment to the main fitting pintle area 32. Thus the combination of forces result in the retraction actuator 30 being in compression and the walking beam 28 being in tension, and the two cooperate to apply a torque around the pintle axis to retract the landing gear 10 in a known manner.

Figure 2:
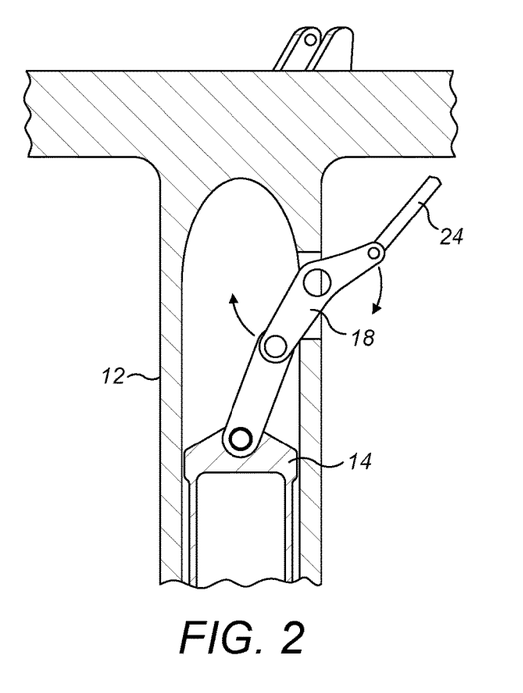
FIG. 2 is a diagram illustrating the motion of the drive link and lever in the aircraft landing gear of FIG. 1 during shortening.

The present inventor has identified that the motion of the walking beam 28, attached to the actuator link 34 at one end and the main fitting pintle arm 32 at the other, means that it moves relative to the main fitting 12 in a manner that is suitable to provide an attachment point for the drive link 24. Thus, the motion of the walking beam 28 can be utilized to move the drive link 24, which rotates the lever 18, which in turn lifts the shock absorber 14 within the main fitting 12 to shorten the landing gear, as shown in FIG. 2. This results in the landing gear 10 being shortened as it moves to the stowed condition as illustrated in FIG. 1b.

In the illustrated example, the walking beam 28 is positioned at or adjacent to the area of intersection between the pintle axis and the longitudinal axis of the shock absorber 14. However, where this is not the case the case, the skilled person could modify the shortening linkage to reach the shock absorber.

Figure 3A:
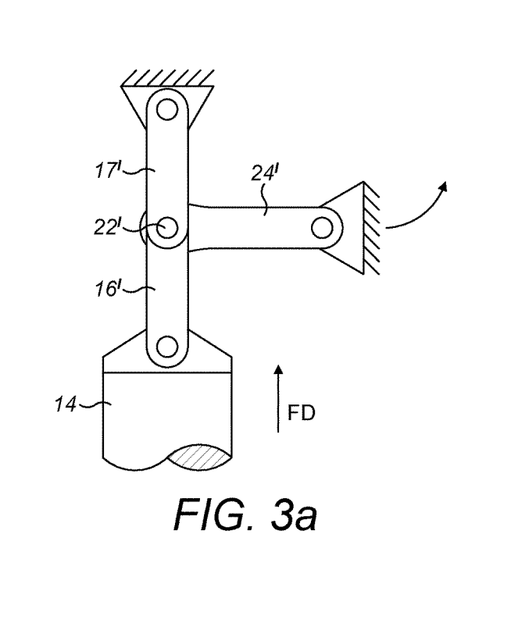
FIGS. 3a to 3c are diagrams illustrating mechanisms that can be used in place of the lever in the aircraft landing gear of FIG. 1.
Figure 3B:
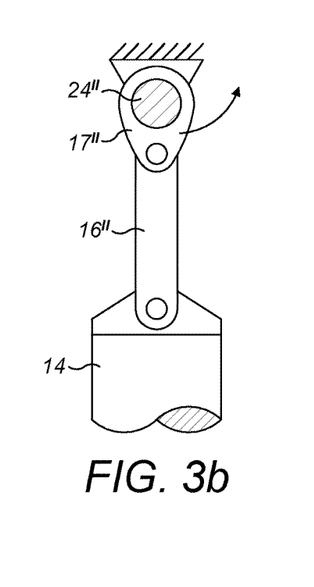
Figure 3C:
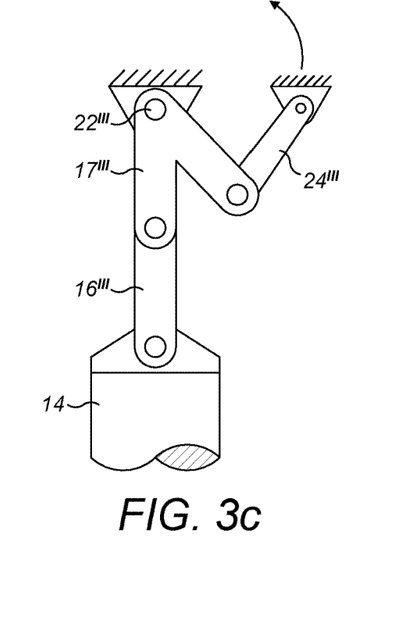

FIGS. 3a to 3c illustrate some examples of other mechanisms which can be used instead of the lever arrangement described above. In FIG. 3a, a shortening link 16' is aligned with an upper link 17' to react movement of the shock absorber 14 in the first direction FD. A drive link 24' can be moved by a connection to the walking beam 28 to cause the shortening link 16' to pivot relative to the upper link 17' via pivot 22' to displace the shock absorber in the first direction FD. In FIG. 3b, the upper link 17" can be in the form of a bell crank drive by rotation of shaft 24" through an appropriate connection to the walking beam to lift the shortening link 16" to lift the shock absorber 14. Likewise, in FIG. 3c a v-shaped lever 17'" is cause to pivot about pivot 22'" though a force applied by drive link 24'" connected to the walking beam to lift the shortening link 16'" to lift the shock absorber 14.

While in the illustrated examples presented above the shortening mechanism is coupled to the walking beam, in other embodiments the shortening mechanism can be coupled to other parts of the landing gear. For example, if there is an aircraft and/or landing gear configuration where the walking beam 28 is in an unsuitable position, or the preferred location is blocked by other equipment or structure, then the top of the drive link 24 can alternatively be attached to the cross beam 38 instead of the walking beam 28. The distance between the axes of the shock absorber and the cross beam 38 can be accommodated by inclining the drive link 24 or by rotating the pivot 22 hence the plane of the shortening mechanism around the shock absorber axis, or by a combination of the two.

Figure 4:
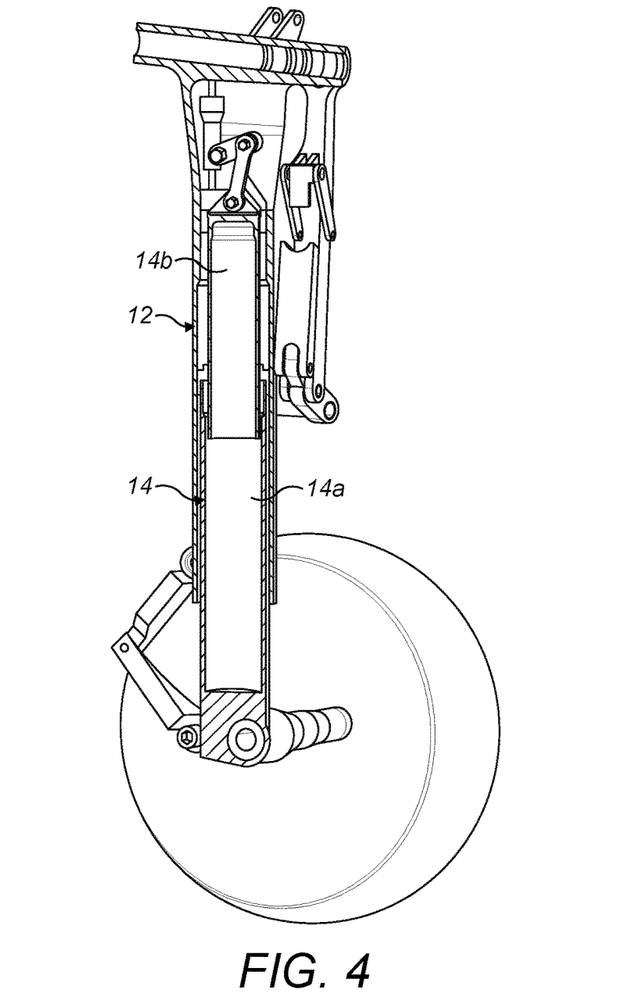
FIG. 4 is a diagram of a shock absorber that can be used with the aircraft landing gear of FIG. 1.

FIG. 4 shows a known type of shock absorber 14 that can be used with the landing gear of FIGS. 1a and 1b. As is common, the shock absorber 14 consists of an outer cylinder, which can define the main fitting 12 itself, and an inner piston which is often the sliding tube of the strut. In embodiments where the shock absorber 14 is of the capsule type, the telescopic shock absorber 14 has to slide within a distinct main fitting 12. The illustrated shortening arrangement inverts the shock absorber 14 so that the outer cylinder acts as the sliding tube and the inner piston is a separate tube, attached to the shortening link 16, within the main fitting 12. It has the advantage of avoiding a need for an orifice support tube inside the shock absorber 14. If the main fitting 12 were to remain the same diameter as if it were a non-shortening gear then the outer cylinder would have to reduce to the diameter of the sliding tube, and the inner piston would be smaller diameter (since it must slide within the sliding tube/outer cylinder). The static pressure of the shock absorber 14 is inversely proportional to the cross sectional area of the inner piston, and thus the static pressure would increase if the main fitting 12 stays the same diameter. It is undesirable for the static pressure to rise significantly; hence the main fitting 12 would have to increase in diameter to allow the other shock absorber 14 parts to increase.

Figure 5:
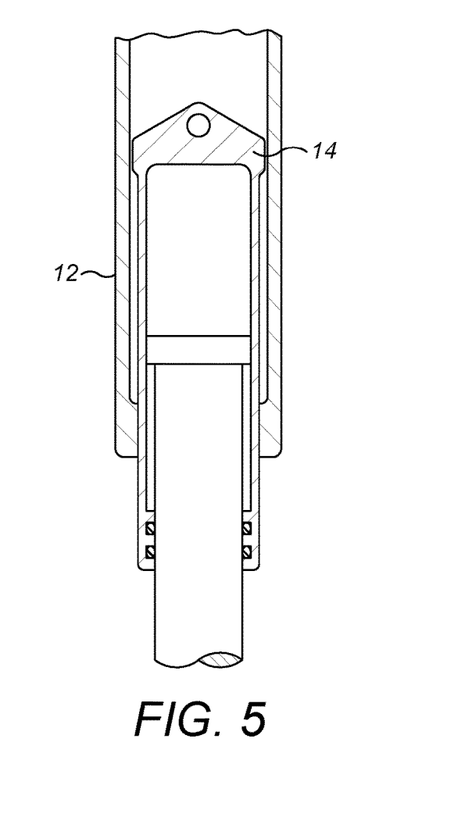
FIG. 5 is a diagram of another shock absorber that can be used with the aircraft landing gear of FIG. 1.

As shown in FIG. 5, an alternative embodiment mounts the outer cylinder of the shock absorber 14 so that it may slide within the main fitting 12. There is now an additional cylinder between the main fitting 12 and the inner piston, so again either static pressure must rise if the main fitting 12 stays the same diameter or else the main fitting 12 diameter must increase.

Figure 6:
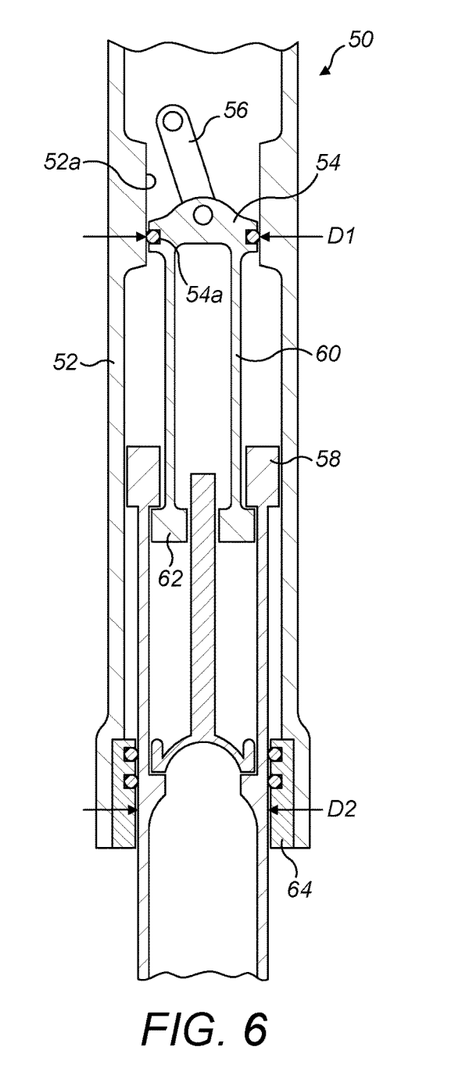
FIG. 6 is a diagram of another shock absorber that can be used with the aircraft landing gear of FIG. 1.

Referring to FIG. 6, a shock absorber 50 according to an embodiment of the invention is shown. The shock absorber 50 can be used with the landing gear of FIG. 1, or alternatively with other types of shortening mechanism. The outer cylinder 52 can define a main fitting. An upper diaphragm 54 is connected to the shortening link 56 and may slide within the main fitting 52. Thus, the upper diaphragm 54 forms the shortening portion of the shock absorber. The sliding tube/inner piston 58 can remain the same diameter as for a non-shortening gear. The orifice support tube 60, extending from the upper diaphragm 54, may include a lower abutment 62 arranged be used as an out stop to prevent the sliding tube 58 from over extending from the shock absorber 50.

The arrangement in FIG. 6 shows a diaphragm 54 with one or more dynamic seals 54a on its outside diameter, sliding in the bore 52a of the main fitting 52 in the manner of a piston. Thus, the sliding diameter D1 of the upper diaphragm 54 is the same as that D2 of the sliding tube 58 (i.e. a reduced diameter section in the bore of the main fitting 52). This arrangement has an advantage that the distance between the top of the piston and rod assembly 58 and the underside of the diaphragm 54 or the underside of the step in the main fitting bore need only accommodate the normal shock absorber compressive suspension stroke. The shortening stroke is contained within it. The volume of the shock absorber 50 will remain constant when the upper diaphragm 54 is moved by the shortening link 56.

Figure 7:
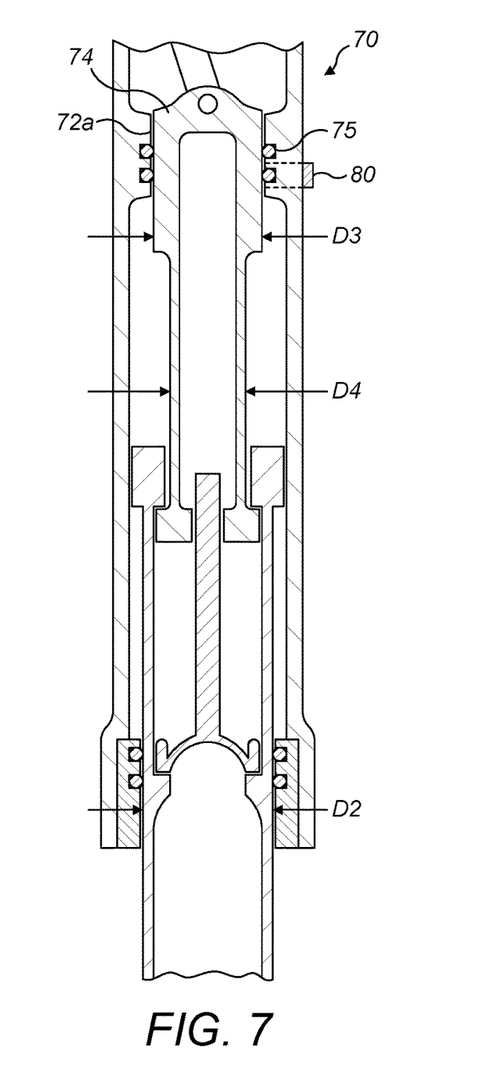
FIG. 7 is a diagram of another shock absorber that can be used with the aircraft landing gear of FIG. 1.

It is recognized that replacement of the diaphragm 54 as shown in FIG. 6 such as in order to replace the dynamic seal would require dismantling of the shock absorber. An alternative arrangement 70 is shown in FIG. 7, where the diaphragm 74 passes through one or more dynamic seals 75 in the main fitting bore 72a in the manner of a rod. This has an advantage that it places seals 75 on the outer component such that with dual seals a worn or damaged seal may be bypassed and its function transferred to the second seal by means of a manually operated external changeover valve 80 in a known manner.

The arrangement shown in FIG. 7 has a disadvantage that since the outside sealing diameter D3 of the diaphragm 74 must be the same as the rod diameter D2 of the sliding tube/inner piston if the shock absorber is to remain constant volume when shortening, it follows that the inside diameter of the sliding tube/inner piston will not slide over the outside sealing diameter of the diaphragm. Thus the lower portion of the diaphragm/orifice support tube component must be reduced in diameter D4, in the region of the normal shock absorber compressive suspension stroke. Hence the total distance between the top of the piston and rod assembly and the underside of the step in the main fitting bore must be at least the sum of the normal shock absorber compressive suspension stroke and the shortening travel. As a result of this, the total shock absorber length of the arrangement in FIG. 7 can be greater than that of the arrangement in FIG. 6, resulting in an increase in weight.

Components of the aircraft landing gear and/or shock absorber struts according to embodiments of the invention can be implemented from conventional aerospace materials, such as titanium, aluminum and/or steel for structural members, polymer or metal bearings etc.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear comprising:
    a shock absorbing strut arranged to support the weight of an aircraft on the ground, the shock absorbing strut comprising:
        a hollow strut element having an open first end and a mounting connector at a second end via which the strut element is arranged to be pivotally connected to the aircraft to define a strut pivot axis; and
        a shock absorber comprising a first element and a second element, the second element comprising a shortening portion which is slidably mounted relative to the strut element for axial movement relative to the strut element, and the second element having a wheel assembly coupling, the shock absorber including a mechanical linkage between the shortening portion and the second element, the mechanical linkage being configured to engage the second element when the shock absorber is extended such that axial movement of the shortening portion within the strut element in a first axial direction towards the strut pivot axis causes the second element to move towards the strut pivot axis to shorten the shock absorbing strut, wherein one of the first element and the second element comprises an outer cylinder, and the other of the first element and the second element comprises a sliding tube;
    a retraction actuator pivotally coupled at a first end to a lug on the strut element and pivotally connected at a second end to an actuator link, the actuator link having an aircraft connector via which it is arranged to be pivotally coupled to the aircraft;
    an elongate beam pivotally coupled at a first end to the second end of the retraction actuator and pivotally coupled to a second lug on the strut element, and
    a shortening mechanism coupled between the elongate beam and the shortening portion of the shock absorber and being arranged such that:
        when the elongate beam is at a first position due to a first extension state of the retraction actuator the shortening mechanism is in a locked condition in which it inhibits axial movement of the shortening portion within the strut element in the first axial direction; and
        as the retraction actuator changes in extension state from the first extension state towards a second extension state, the retraction actuator moves the elongate beam which in turn causes the shortening mechanism to move the shortening portion within the strut element in the first axial direction to shorten the shock absorbing strut.

2. The aircraft landing gear according to claim 1, wherein the shortening mechanism includes a lever pivotally coupled at a midpoint to a third lug on the strut element, one end of the lever being pivotally coupled to a drive link which in turn is pivotally coupled to the second end of the elongate beam, the second end of the lever being pivotally coupled to a shortening link which in turn is pivotally coupled to the shortening portion of the shock absorber.

3. The aircraft landing gear according to claim 2, wherein the lever is of unitary construction.

4. The aircraft landing gear according to claim 1, wherein the shortening linkage is coupled to the elongate beam at an extension portion of the beam which projects beyond the pivot between the second lug and the beam.

5. The aircraft landing gear according to claim 1, wherein the shortening mechanism is arranged to shorten the shock absorbing strut by at least 50 mm.

6. The aircraft landing gear according to claim 1, wherein the shock absorber is distinct from the strut element and at least some of the shock absorber is located within the strut element.

7. The aircraft landing gear according to claim 1, wherein the outer cylinder of the shock absorber defines the strut element.

8. A shock absorber for an aircraft landing gear shock absorbing strut, the shock absorber comprising:
    an outer cylinder defining a bore that is open at a first end of the outer cylinder;
    a piston and rod assembly the piston of which is slidably coupled within the bore of the outer cylinder for axial movement within it, the rod of which extends from the open first end of the bore through a first bearing and seal assembly;
    a diaphragm slidably coupled within the bore of the outer cylinder between the piston and a second end of the outer cylinder, the diaphragm and/or inner wall of the outer cylinder being provided with one or more first dynamic seals arranged such that the diaphragm can move between a first position and a second position while maintaining a fluid seal between the diaphragm and the inner wall of the outer cylinder;
    a mechanical linkage between the diaphragm and the piston and rod assembly that limits axial separation between them; and
    a shortening device arranged to move the diaphragm between the first and second positions, wherein the shock absorber is arranged such that with the diaphragm in the first position the mechanical linkage is positioned to permit extension and contraction of the shock absorber and as the diaphragm is moved from the first position towards the second position by the shortening device with the shock absorber fully extended the mechanical linkage pulls the piston and rod assembly to shorten the shock absorber.

9. The shock absorber according to claim 8, wherein the outer diameter of the diaphragm is equal to the outer diameter of the rod of the piston and rod assembly.

10. The shock absorber according to claim 8, wherein the mechanical linkage comprises an orifice support tube which extends from the diaphragm into a hollow bore defined by the piston and rod assembly, the orifice support tube including an outwardly projecting radial flange which engages with the piston to pull the piston and rod assembly to shorten the shock absorber.

11. The shock absorber according to claim 8, wherein the outer circumferential wall of the diaphragm houses one or more first dynamic seals arranged to act against the inner wall of the outer cylinder for sealing engagement as the diaphragm moves.

12. The shock absorber according to claim 8, wherein the inner wall of the outer cylinder houses one or more first dynamic seals arranged to act against the outer circumferential wall of the diaphragm for sealing engagement as the diaphragm moves.

13. The shock absorber according to claim 8, wherein a portion of the outer cylinder on the outside of the diaphragm relative to the piston includes a port which is open to atmosphere.

14. The shock absorber according to claim 8, wherein the outer cylinder includes a mounting connector at a second end via which it is arranged to be pivotally connected to an aircraft such that the outer cylinder of the shock absorber defines a strut element.

15. The shock absorber according to claim 8, wherein the shock absorber is distinct from a hollow strut element which includes a mounting connector at a second end via which it is arranged to be pivotally connected to an aircraft and at least some of the shock absorber is located within the strut element.

* * * * *